US010678791B2

(12) United States Patent
Chavan et al.

(10) Patent No.: US 10,678,791 B2
(45) Date of Patent: Jun. 9, 2020

(54) USING SHARED DICTIONARIES ON JOIN COLUMNS TO IMPROVE PERFORMANCE OF JOINS IN RELATIONAL DATABASES

(71) Applicant: Oracle International Corporation, Redwood Shores, CA (US)

(72) Inventors: Shasank K. Chavan, Menlo Park, CA (US); Dina Thomas, Palo Alto, CA (US); Ajit Mylavarapu, Mountain View, CA (US); Prashant Gaharwar, San Mateo, CA (US); Tirthankar Lahiri, Palo Alto, CA (US); Jesse Kamp, Castro Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 497 days.

(21) Appl. No.: 15/602,009

(22) Filed: May 22, 2017

(65) Prior Publication Data
US 2017/0255675 A1      Sep. 7, 2017

Related U.S. Application Data

(63) Continuation-in-part of application No. 15/294,460, filed on Oct. 14, 2016.
(Continued)

(51) Int. Cl.
*G06F 16/2453* (2019.01)
*G06F 16/22* (2019.01)
(Continued)

(52) U.S. Cl.
CPC ......... *G06F 16/24544* (2019.01); *G06F 7/24* (2013.01); *G06F 16/221* (2019.01);
(Continued)

(58) Field of Classification Search
USPC ......................... 707/793, 714, 754
See application file for complete search history.

(56) References Cited

U.S. PATENT DOCUMENTS

| 8,825,678 B2 * | 9/2014 | Potapov ............... G06F 3/0611 707/754 |
| 2001/0000536 A1 | 4/2001 | Tarin |

(Continued)

OTHER PUBLICATIONS

Plattner, Hasso, "The Impact of Columnar In-Memory Databases on Enterprise Systems", Implications of Eliminating Transaction-Maintained Aggregates, Proccedings of the VLDB Endowment, 2014, 8 pages.
(Continued)

*Primary Examiner* — Hung T Vy
(74) *Attorney, Agent, or Firm* — Hickman Palermo Becker Bingham LLP

(57) ABSTRACT

Techniques are described for encoding join columns that belong to the same domain with a common dictionary. The tables are encoded with dictionary indexes that make the comparison operation of a join query a quick equality check of two integers and there is no need to compute any hashes during execution. Additionally, the techniques described herein minimize the bloom filter creation and evaluation cost as well because the dictionary indexes serve as hash values into the bloom filter. If the bloom filter is as large as the range of dictionary indexes, then the filter is no longer a probabilistic structure and can be used to filter rows in the probe phase with full certainty without any significant overhead.

28 Claims, 6 Drawing Sheets

Related U.S. Application Data

(60) Provisional application No. 62/245,948, filed on Oct. 23, 2015, provisional application No. 62/393,780, filed on Sep. 13, 2016, provisional application No. 62/245,952, filed on Oct. 23, 2015, provisional application No. 62/242,119, filed on Oct. 15, 2015.

(51) Int. Cl.
*G06F 16/9535* (2019.01)
*G06F 16/2455* (2019.01)
*G06F 7/24* (2006.01)

(52) U.S. Cl.
CPC .... *G06F 16/2255* (2019.01); *G06F 16/24562* (2019.01); *G06F 16/9535* (2019.01)

(56) References Cited

U.S. PATENT DOCUMENTS

| | | |
|---|---|---|
| 2003/0028509 A1 | 2/2003 | Sah |
| 2003/0088537 A1 | 5/2003 | Ko |
| 2010/0299367 A1* | 11/2010 | Chakrabarti ...... G06F 16/24578 707/803 |
| 2012/0117064 A1 | 5/2012 | Draese |
| 2013/0103654 A1 | 4/2013 | McLachlan |
| 2013/0232176 A1 | 9/2013 | Plattner |
| 2013/0275364 A1* | 10/2013 | Wang ............... G06F 16/283 707/602 |
| 2014/0122452 A1 | 5/2014 | Faerber |
| 2015/0178305 A1 | 6/2015 | Mueller |
| 2015/0324373 A1 | 11/2015 | Tyercha |
| 2016/0196302 A1* | 7/2016 | Beavin ............ G06F 16/24544 707/714 |
| 2017/0024435 A1 | 1/2017 | Kociubes et al. |
| 2017/0109406 A1 | 4/2017 | Chavan |

OTHER PUBLICATIONS

Lee et al., "Joins on Encoded and Partitioned Data", Proceedings of the VLDB Endowment, vol. 7, No. 13 Copyright 2014 VLDB Endowment 2150-8097/14/08, 12 pages.

Bernet, "Dictionary Compression for a Scan-Based, Main-Memory Database System", dated 2010, 89 pages.

Amazon, "Database Developer Guide", dated Dec. 1, 2012, 2 pages.

Chavan, U.S. Appl. No. 15/294,460, filed Oct. 14, 2016, Office Action, dated Jun. 12, 2019.

Chavan, U.S. Appl. No. 15/294,460, filed Oct. 14, 2016, Interview Summary, dated Jul. 29, 2019.

Chavan, U.S. Appl. No. 15/294,460, filed Oct. 14, 2016, Final Office Action, dated Oct. 21, 2019.

Oracle, "Oracle Database In-Memory", dated Aug. 2014, 29 pages.

\* cited by examiner

FACT TABLE 100 "emp"

| NAME | AGE | F-DEPT-ID |
|---|---|---|
| FRED | 34 | 4562 |
| JOE | 35 | 3513 |
| SALLY | 23 | 4562 |
| MARY | 45 | 4562 |
| JIM | 23 | 5315 |
| SARAH | 65 | 3513 |
| ... | ... | ... |

DIMENSION TABLE 102 "dept"

| D-DEPT-ID | DEPT-NAME | BLDG |
|---|---|---|
| 4562 | SALES | A |
| 3513 | LEGAL | B |
| 5315 | AP | A |

FIG. 1

| DICTIONARY 204 | |
|---|---|
| D-DEPT-ID | INDEX |
| 3513 | 0 |
| 4562 | 1 |
| 5315 | 2 |

| DECV 200 |
|---|
| F-DEPT-ID |
| 1 |
| 0 |
| 1 |
| 2 |
| 0 |
| ... |

| DECV 202 |
|---|
| D-DEPT-ID |
| 1 |
| 0 |
| 2 |

FIG. 2

DIMENSION TABLE 302 "dept"

| D-DEPT-ID | DEPT-NAME | BLDG |
|---|---|---|
| 1 | SALES | A |
| 0 | LEGAL | B |
| 2 | AP | A |

FACT TABLE 300 "emp"

| NAME | AGE | F-DEPT-ID |
|---|---|---|
| FRED | 34 | 1 |
| JOE | 35 | 0 |
| SALLY | 23 | 1 |
| MARY | 45 | 1 |
| JIM | 23 | 2 |
| SARAH | 65 | 0 |
| ... | ... | ... |

FIG. 3

USING SHARED DICTIONARIES ON JOIN COLUMNS TO IMPROVE PERFORMANCE OF JOINS IN RELATIONAL DATABASES

CROSS-REFERENCE TO RELATED APPLICATIONS; BENEFIT CLAIM

This application is a continuation-in-part of U.S. patent application Ser. No. 15/294,460, filed on Oct. 14, 2016, which, in turn, claims the benefit of:
Provisional Appln. 62/242,119, filed Oct. 15, 2015,
Provisional Appln. 62/245,952, filed Oct. 23, 2015,
Provisional Appln. 62/245,948, filed Oct. 23, 2015, and
Provisional Appln. 62/393,780, filed Sep. 13, 2016;
the entire contents of U.S. patent application Ser. No. 15/294,460 and each of the provisional applications cited above are hereby incorporated by reference as if fully set forth herein.

FIELD OF THE INVENTION

The present invention relates to using domain level dictionaries on join columns to improve performance of inner joins, semi joins, anti joins and outer joins in relational databases.

BACKGROUND

It is often desirable to combine digital information from two sources based on some relationship between the information from the two sources. Because such operations are common, it is critical that they be performed in an efficient manner.

For the purpose of explanation, examples of the techniques described herein shall be given in the context of database systems. However, the techniques are not limited to such a context, and may be applied in any context in which digital information from one source is being combined with digital information from another source.

In the context of a database system, in a typical join operation, rows from one table are joined with rows from another table based on a join key. For example, assume that a database has an "emp" table with information about employees, and a "dept" table with information about departments. Each row in the emp table corresponds to a particular employee, and has a deptID column that stores the unique identifier of the department in which the employee works. On the other hand, each row in the dept table corresponds to a particular department, and includes a column that stores the deptID of the department represented by the row. A typical join operation may involve combining each row in the emp table with the row in the dept table that has a matching deptID value. In this example, deptID is what is referred to as the "join key" of the join operation.

Hash Joins

One way to increase the performance of a join operation is to (1) generate a hash table based on the join key values in one source, and (2) use the hash table to determine the correlation between rows in the first source and rows in the second source. A join operation that is performed using a hash table is referred to as a "hash join". During the first phase of a hash join (referred to as the "build phase"), the hash table is created by performing the following for each row from one of the row sources involved in the join operation (referred to as the "left-hand" row source): (1) read the row, (2) apply a hash function to the join key value in the row to produce a hash value, (3) use the hash value as an index to identify a particular bucket in a hash table, and (4) store, in the bucket, an entry for the row. The hash table entry for a row typically includes the unique identifier of the row, and the join key value for the row. Because the join-key-value-to-hash-key-value relationship is many-to-one, several rows may hash to the same hash table bucket.

Once all of the rows of the left-hand row source have been processed, the hash table is complete a second phase (referred to as the "probe phase") may begin. During the probe phase, the hash table is used to perform the join by performing the following for each row from the other row source involved in the join operation (referred to as the "right-hand" row source): (1) read the row, (2) apply the hash function to the join key value in the row to produce a hash value, (3) use the hash value as an index into the hash table to identify a particular bucket in the hash table, (4) inspect the entries in the bucket (if any) to identify entries for any left-hand rows that have the same join key value as the row, and (5) combine the row with each left-hand row that has the same join key value.

Hash joins are often accompanied by predicates on the tables involved in the join. A significant fraction of the time in hash joins is spent computing the hash on join columns of both the build and the probe-side of the join and applying the applicable predicates. The conventional approach to performing hash joins involves hash computation on each row of both the build and probe-side relations.

Bloom filters are probabilistic data structures used to test whether an element is a member of a set. In a context of a join, bloom filters may be used to determine whether a join value from one table involved in the join in the set of values from the join column of the other table involved in the join. Bloom filters are described in en.wikipedia.org/wikiBloom_filter and U.S. Pat. No. 8,145,642, which are incorporated herein by reference. When a bloom filter is used in combination with a hash join, hash computations on the join column values may also be required for building and evaluating the bloom filter. The repeated hash computation (both in building the bloom filter and in the hash join itself) can be an expensive step, especially if the join attribute is a wide char/varchar column. Further, if the values in the join columns are compressed, encrypted, or otherwise encoded, the values will typically have to be decoded prior to applying the hash function.

Even if the database server caches the hash value of repeated values, the database server still needs to perform the hash operation on every unique value at execution time. Also, once the build and probe phases are over, the final join result needs to projected, which requires going through each hash bucket, and walking through the chain, serially, performing hash comparisons and full key comparisons on matches, and then stitching the relevant columns of each row into final row vectors.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that depicts a fact table and dimension table used in examples herein to explain embodiments of the invention;

FIG. 2 is a block diagram that depicts a single dictionary that may be used to create dictionary encoded column vectors for two or more columns, according to an embodiment;

FIG. 3 is a block diagram that illustrates tables where join column values have been replaced with dictionary codes, according to an embodiment;

DETAILED DESCRIPTION

Figure 4:
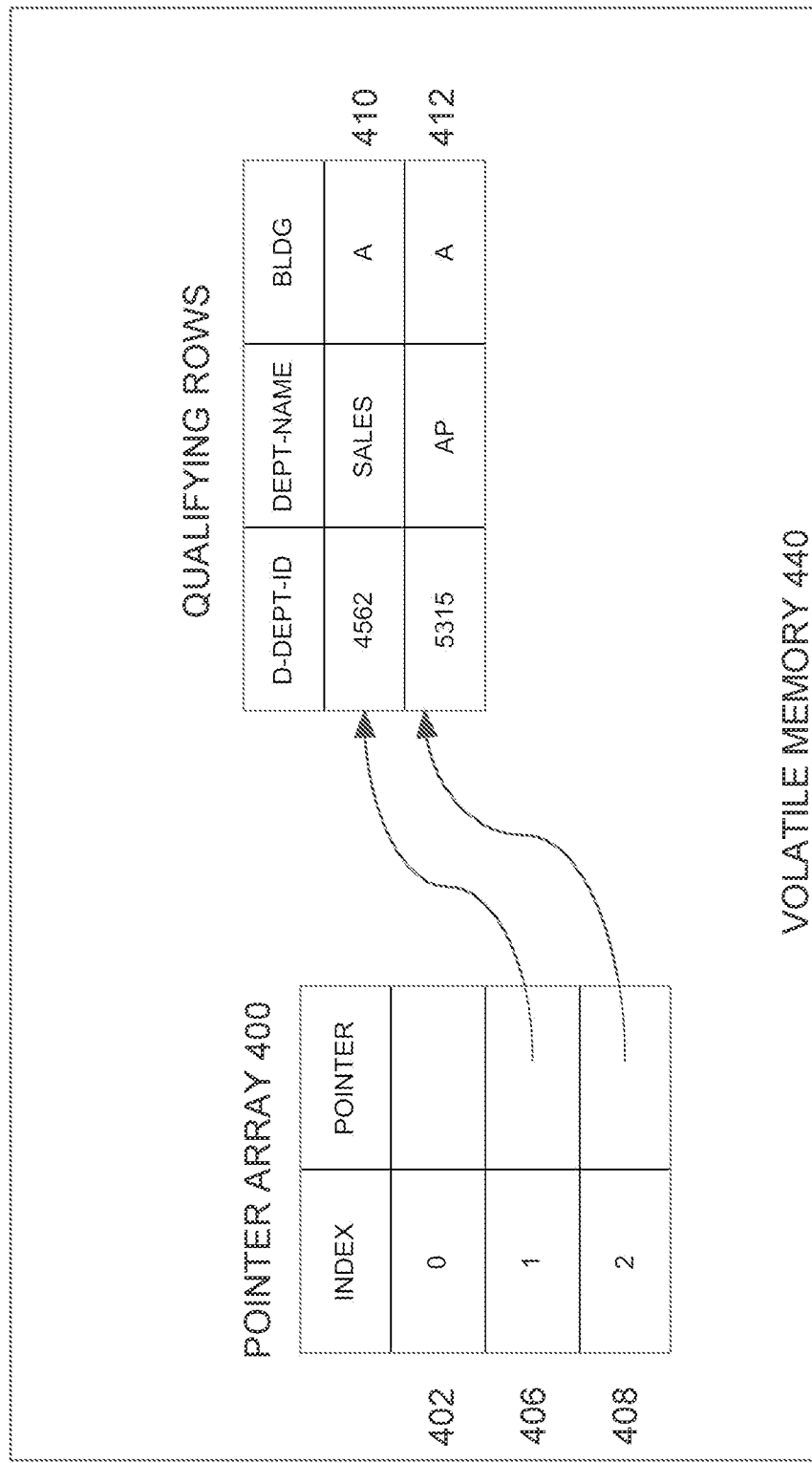
FIG. 4 is a block diagram that illustrates a pointer array that may be used in place of a conventional hash table to quickly locate matching build-side rows based on dictionary indexes, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described hereafter for performing hash joins in a manner that does away with the expensive operations mentioned above by—

Encoding the join columns with a common dictionary, thus significantly speeding up hash join performance and converting the hash-lookup to a much faster vector-lookup Reducing or eliminating the cost of bloom filter creation and evaluation to speed up filtering Leveraging SIMD vector operations on fixed-size elements in a vector-lookup array for faster joins and projection of matching data.

As mentioned above, existing hash join solutions hash the attribute value and then do a hash comparison. This is done at execution time, making it a lengthy and expensive operation. The cost is even higher if the join column values need to be decoded prior to hashing.

The approaches described herein exploit the fact that the join columns belong to the same domain (e.g. when the join columns of both tables involved in the join contain user-ids) and can be represented with numerical codes from a common dictionary. Techniques for encoding columns of multiple tables using a common dictionary are described in U.S. patent application Ser. No. 15/294,460, which is incorporated herein by reference. The tables are encoded with dictionary indexes that make the comparison operation a quick equality check of two integers and there is no need to compute any hashes during execution. Additionally, the techniques described herein minimize the bloom filter creation and evaluation cost as well because the dictionary indexes can serve as hash values into the bloom filter. In fact, if the bloom filter is as large as the range of dictionary indexes, then the filter is no longer a probabilistic structure and can be used to filter rows in the probe phase with full certainty without any significant overhead.

Another improvement is the use of SIMD-instructions to process the fixed-size elements (dictionary indexes) to match to join columns and stitch the columns quickly and project the rows.

Join Groups

As used herein, a "join group" is a group of attributes (columns) that are likely to be joined with each other in a multi-relation join. The database server can detect join groups either automatically (e.g. using Primary Key-Foreign Key relations), or users can explicitly create a join group on multiple columns from different tables using extension to SQL. According to an embodiment, columns may be later added or removed from a join group to adjust join groups as the schema changes.

Referring to FIG. 1, it illustrates a fact table 100 "emp" and a dimension table 102 "dept". Tables 100 and 102 may reside within a database, on persistent storage, such as a magnetic disk. Each row in fact table 100 corresponds to a different person, and has a f-dept-id column to indicate the department to which the person belongs. Each row in dimension table 102 corresponds to a different department, stores a unique department identifier in the d-dept-id column, and includes information about the department (e.g. DEPT-NAME and BLDG).

As is typical, the number of rows in dimension table 102 is significantly smaller than the number of rows in fact table 104. In the specific example illustrated in FIG. 1, dimension table 102 only has three rows. Only six rows of fact table 100 are shown, but it is not uncommon for fact tables to have thousands or even millions of rows.

Column f-dept-id from fact table 100 has a foreign key relationship with column d-dept-id from dimension table 102. Consequently, when rows from fact table 100 are joined with rows from dimension table 102, it is likely that f-dept-id and d-dept-id will be the join columns. An example query (Q1) that joins rows from table 100 with rows from table 102 is:

SELECT emp.*, dept.*
FROM emp, dept
WHERE f-dept-id=d-dept-id AND BLDG='A'

Query Q1 joins the rows from "emp" with "dept" based on the columns f-dept-id and d-dept-id, and selects all rows produced by the join (the "joined rows") that contain data for employees that are in building A. Based on the fact table rows shown in FIG. 1, the result of executing this query would be:

| NAME | AGE | F-DEPT-ID | D-DEPT-ID | DEPT-NAME | BLDG |
|------|-----|-----------|-----------|-----------|------|
| FRED | 34 | 4562 | 4562 | SALES | A |
| SALLY | 23 | 4562 | 4562 | SALES | A |
| MARY | 45 | 4562 | 4562 | SALES | A |
| JIM | 23 | 5315 | 5315 | AP | A |

Since f-dept-id and d-dept-id are columns that are likely to be joined (as evident by the foreign key relationship established between these columns), the database server may automatically establish f-dept-id and d-dept-id as a join group. Alternatively, a user may submit commands to the database to explicitly create a join group for columns f-dept-id and d-dept-id based on the user's knowledge that these columns are likely to be joined. As shall be explained hereafter, the techniques described herein involve dictionary encoding the columns that belong to a join group with the same "global" dictionary. The dictionary is "global" in that it is used to encode all columns in the join group.

Explicit Creation of a Join Group

As mentioned above, users may explicitly create join groups based on their knowledge of which columns are likely to be joined in join operations. According to one embodiment, join groups may be explicitly created using a command with the following syntax:

CREATE inmemory join group jg1 (D(c1), F(c2));

In this example, "jg1" is the name given to the join group, and the members of the join group are column c1 of table D, and column c2 of table F. While this example only specifies two columns for the join group, there is no limit to the number of columns that may be included in a join group. The "inmemory" parameter indicates that dictionary encoded column vectors are to be generated for the columns in the join group when those columns are loaded into volatile memory. Under these circumstances, the on-disk version of the columns in the join group may remain in an unencoded state.

In alternative embodiments, the on-disk version of the columns that belong to the join group may already be encoded using a dictionary that is shared among all columns in the join group. When the on-disk columns of a join group are already encoded, creating separate in-memory dictionary encoded column vectors of the columns requires less overhead, since the dictionary encoding has already taken place. Thus, prior to constructing an in-memory column vector of dictionary-encoded values, the base data may be stored in numerous ways, including but not limited to:
  row-major unencoded on-disk
  row-major unencoded on-disk+separate encoded column vector on-disk
  row-major encoded on-disk
  row-major encoded on-disk+separate encoded column vector on-disk
  column-major unencoded on-disk
  column-major unencoded on-disk+separate encoded column vector on-disk
  column-major encoded on-disk In embodiments where the database server maintains a separate on-disk dictionary encoded column vector of each of the columns, both on-disk copies of each column would have to be updated when an update is made to the column.

Implicit Creation of Join Groups

As mentioned above, in addition to or instead of user-specified join groups, join groups may be automatically created by the database server. According to one embodiment, the database server creates join groups based on constraints. For example, in response to detecting that a foreign key constraint exists between two columns, the database server may automatically create a join group for those two columns.

According to another embodiment, the database server creates join groups based on the query history. For example, if 90% of the time that the database server receives a query that joins tables A and B the join columns are A.c1 and B.c2, then the database server may automatically create a join group for A.c1 and B.c2. In this example, 90% is merely an example of a threshold that may be used to determine when automatic creation of a join group is triggered. The actual threshold may vary from implementation to implementation.

Rather than use a percentage threshold, the threshold may simply be the number of joins between the columns. For example, in response to processing five queries that join A.c1 and B.c2, the database server may automatically create a join group for A.c1 and B.c2.

Creating a Global Dictionary for a Join Group

Once a join group is created, a dictionary of all unique values in the join group is constructed. Each unique value is associated with a unique integral number. The integral number associated with a value is called the dictionary index for the value. For the join group containing columns f-dept-id and d-dept-id, the unique values are: 4562, 3513 and 5315. These unique values may be assigned integral numbers, as illustrated in dictionary 204 in FIG. 2.

In dictionary 204, the values are sorted prior to dictionary index assignment. That is, the values are sorted to produce the sequence 3513, 4562 and 5315 prior to assigning the indexes 0, 1 and 2, respectively. By sorting the values prior to dictionary index assignment, binary searches can be performed on the dictionary entries to speed up value-to-index look-ups. However, in alternative embodiments, the values within the dictionary may be unsorted.

Adding a column to a join group will cause new entries to be added to the dictionary if the new column has values that do not occur in any of the columns that are already in the join group. According to one embodiment, removing a column from the join group has no effect on the dictionary.

Creating Dictionary Encoded Column Vectors

A dictionary-encoded column vector of a column is a vector of dictionary codes where, for every value n, the code at the $n^{th}$ position in the vector is the code that was assigned to the unencoded value in the $n^{th}$ row of that column. Thus, if the dictionary code for "Name1" is 5, and the unencoded value in the first row of a column is "Name1", then the first value in the dictionary-encoded column vector of that column would be 5. Once a global dictionary is created for a join group, the global dictionary is used to generate dictionary-encoded column vectors for the columns that belong to the join group. In the dictionary-encoded column vectors, the join attribute values are replaced by the corresponding dictionary codes.

As mentioned above, the actual event that triggers the creation of dictionary-encoded column vectors may vary based on whether the encoding is to be on-disk or only in-memory. If the encoding is to be on-disk, then the on-disk columns that belong to the join group may be replaced with dictionary encoded columns, or a separate on-disk dictionary-encoded column vector may be created. If, on the other hand, the encoding is to be only "in-memory", then the original on-disk columns are not changed. Rather, dictionary-encoded column vectors are created for the columns when the columns are to be loaded into volatile memory in response to a load-triggering event. The columns may be loaded into volatile memory, for example, when a load-triggering event causes creation of in-memory compression units (IMCUs). IMCUs and load-triggering events are described in detail in U.S. Pat. No. 9,292,564, the entire contents of which are incorporated herein by reference.

For the purpose of explanation, it shall be assumed that the join group that includes F-DEPT-ID and D-DEPT-ID is an in-memory join group. Thus, the on-disk F-DEPT-ID and D-DEPT-ID columns remain populated with the actual department identifier values, as illustrated in FIG. 1. Dictionary encoded column vectors for F-DEPT-ID and D-DEPT-ID are created in volatile memory response to a load-triggering event. Referring to FIG. 2, encoding the F-DEPT-ID column using dictionary 204 produces dictionary-encoded column vector (DECV) 200. Encoding D-DEPT-ID column using dictionary 204 produces DECV 202.

In contrast, when the encoding is on-disk, the dictionary-encoded column vectors are created for the columns in the join group by actually replacing those columns, in the on-disk tables, with dictionary-encoded columns. In the present example, replacing the original columns with dictionary-encoded columns would produce tables 300 and 302 depicted in FIG. 3. In an alternative on-disk embodiment, the original on-disk tables are not modified and the dictionary-encoded column vectors 200 and 202 are created on-disk separate from the tables.

Identifying Predicate-Satisfying Build-Side Rows

In response to receiving a query, such as Q1, that joins columns that belong to a join group, the database server determines which build-side rows satisfy the predicate of the query. If the query has no predicate, then all build-side rows are selected. In the present example, the rows of dimension table "dept" that satisfy the predicate (WHERE BLDG='A') of query Q1 are:

| D-DEPT-ID | DEPT-NAME | BLDG |
|---|---|---|
| 4562 | SALES | A |
| 5315 | AP | A |

According to one embodiment, once identified, these predicate-satisfying build-side rows (hereinafter "qualifying rows") are loaded into volatile memory. However, not all columns of the rows need be loaded. Rather, only those columns that must be returned by the query are loaded.

In an alternative embodiment, all build-side rows are loaded into volatile memory regardless of whether they satisfy predicates of the query. In such an embodiment, a dictionary-based filter may be used to avoid joining build-side rows that do not satisfy predicates. Dictionary-based filters are described in greater detail hereafter.

FIG. 4 illustrates that the two qualifying rows have been loaded into volatile memory 440. In the present example, query Q1 returns all columns of "dept" (due to "dept.*" in the SELECT clause). Therefore, all columns of the two qualifying rows are loaded into volatile memory.

Building a Pointer Array

Once the qualifying rows have been loaded into volatile memory 440, the database server constructs a pointer array that has one entry for each value in the join group's dictionary. In the present example, the join group's dictionary 204 has three values, so the pointer-array has three entries. A three-entry pointer array 400 is illustrated in FIG. 4.

For the purpose of explanation, pointer array 400 is shown with an "index" column. However, the index value of an array is implicitly indicated by the position of the entry within the array. Thus, the first entry 402 implicitly corresponds to index value 0 (dictionary code 0), the second entry 404 implicitly corresponds to index value 1, etc. Thus, an explicit column indicating the index value of each entry is unnecessary.

As indicated in FIG. 4, the position of each entry in the pointer-array 400 corresponds to an index value. According to one embodiment, each entry in the pointer array 400 is fixed width (e.g. 4 bytes). In embodiments where the entries are fixed width, any given entry may be quickly located from the start of the array using an offset that is calculated by multiplying the index of the entry by the fixed entry size.

The content of each entry is a pointer to the memory location of the qualifying row(s) that has the join-column-code that matches that index value. For example, entry 402 corresponds to index value 0. No qualifying rows have a join-column-code that matches 0 (because 0 corresponds to a department (D-DEPT-ID 3513) that is not in building A). Hence, entry 402 has no pointer.

Entry 404, on the other hand, corresponds to index value 1. Index value 1 corresponds to department 4562 that is in building A. Consequently, entry 404 has a pointer to the memory location of the qualifying row that corresponds to department 4562.

Entry 408 corresponds to index value 2. Index value 2 corresponds to department 5315 that is also in building A. Consequently, entry 408 has a pointer to the memory location of the qualifying row that corresponds to department 5315.

The Probe Phase

Figure 5:
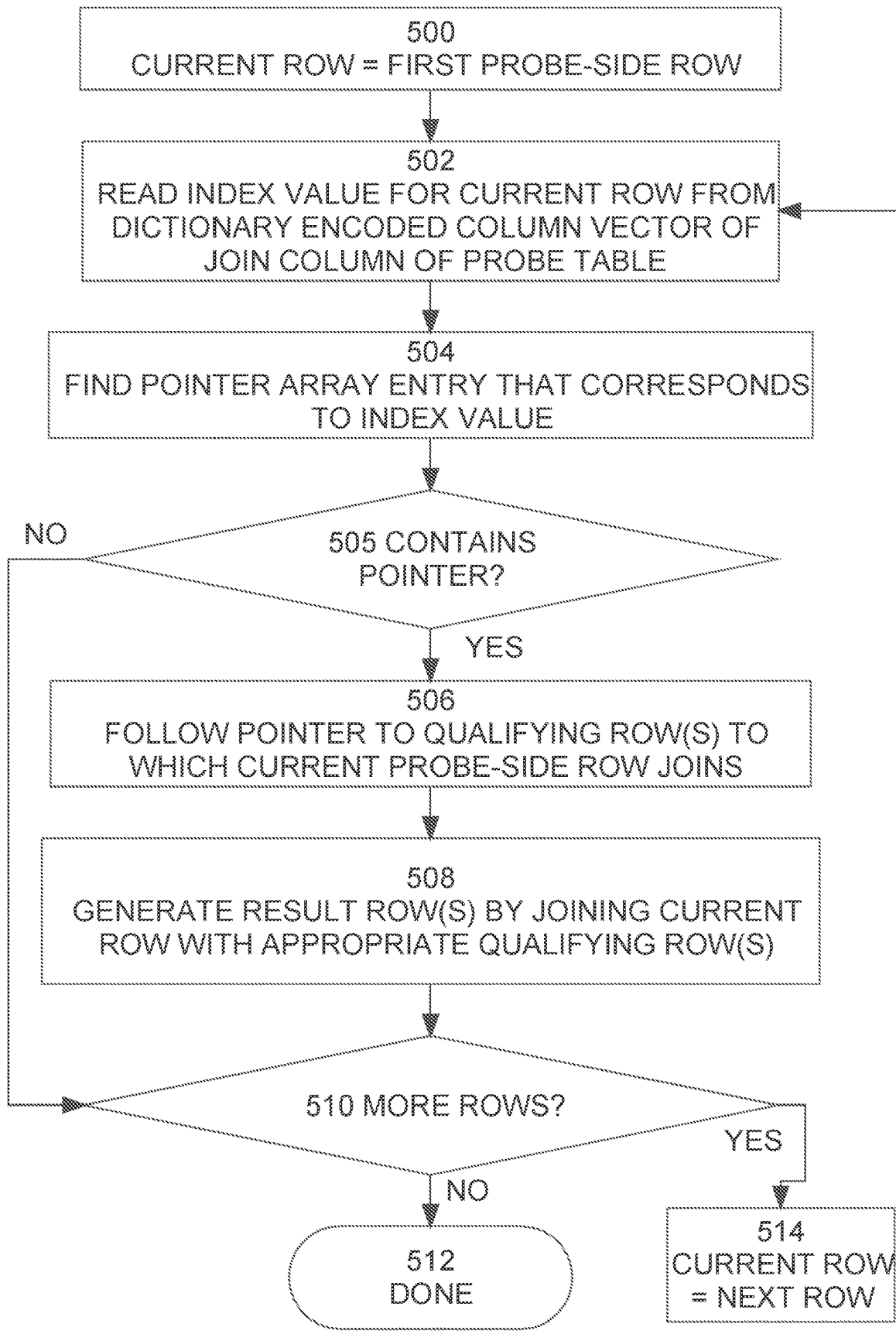
FIG. 5 is a flowchart the illustrates the steps for using a pointer array during an inner join operation, according to an embodiment.

Once the qualifying rows have been identified, loaded into volatile memory 440, and the pointer array 400 has been built, the probe phase of the join may be performed very efficiently. FIG. 5 is a flowchart that illustrates how the probe phase may be performed, according to an embodiment.

Referring to FIG. 5, at step 500 the first row of the probe table (fact table 300) is established as the current row. Steps 502-514 form a loop that is repeated for each row of the probe table. Specifically, at step 502, the database server reads the index value for the current row from the dictionary encoded column vector for the join column of the probe table. In the present example, the join column of the probe table is F-DEPT-ID, and the dictionary-encoded column vector for F-DEPT-ID is shown as DECV 200 in FIG. 2. Consequently, during the first iteration of step 502, the database server reads the first entry of DECV 200, which is the dictionary index value "1".

At step 504, the database server uses the dictionary index that was obtained in step 502 as an index into the pointer array 400 to find the entry that corresponds to the index value. In the present example, during the first iteration of step 504, the index value "1" is used to locate entry 406 of pointer array 400.

At step 505, the database server determines whether the entry of pointer array 400 that was located in step 504 has any pointer. If the entry has a pointer, then control proceeds to step 506. Otherwise, control proceeds to step 510.

The entry located in step 504 will have a pointer if any qualifying row has a join value that corresponds to the join value of the current row. In the present case, entries 406 and 408 have pointers, and entry 402 does not. During the first iteration, entry 406 (which has a pointer) was located in step 504, so control proceeds from step 505 to step 506.

At step 506, the database server uses the pointer that was located in step 504 to locate the qualifying row(s) to which the current probe-side row joins. In the present example, the pointer in entry 406 points to the qualifying row 410.

At step 508, the database server generates result row(s) by combining columns from the current probe-side row with the qualifying row(s) located during step 506. In the present example, during the first iteration, values from the first row of fact table 300 are joined with qualifying row 410 to produce the result row:

| NAME | AGE | F-DEPT-ID | D-DEPT-ID | DEPT-NAME | BLDG |
|---|---|---|---|---|---|
| FRED | 34 | 4562 | 4562 | SALES | A |

Control then proceeds to step 510, where it is determined whether any more rows of the probe-side table need to be processed. In the present example, fact table 300 has six rows, so after the first iteration there are still five rows to process. Therefore, control passes to step 514, and the next row is established as the current row. Control then passes back to 502 to process the second row of fact table 300.

During the second iteration of step 502, the database server reads the second entry of DECV 200, which contains the dictionary index value "0".

At step 504, the database server uses the dictionary index that was obtained in step 502 as an index into the pointer array 400 to find the entry that corresponds to the index value. In the present example, during the second iteration of step 504, the index value "0" is used to locate entry 402 of pointer array 400.

At step 505, the database server determines whether the entry of pointer array 400 that was located in step 504 has any pointer. If the entry has a pointer, then control proceeds to step 506. Otherwise, control proceeds to step 510.

During the second iteration, entry 402 (which has no pointer) was located in step 504, so control proceeds from step 505 to step 510. At step 510, it is determined whether any more rows of the probe-side table need to be processed. In the present example, fact table 300 has six rows, so after the second iteration there are still four rows to process. Therefore, control passes to step 514, and the next row is established as the current row. Control then passes back to 502 to process the third row of fact table 300.

During the third iteration of step 502, the database server reads the third entry of DECV 200, which is the dictionary index value "1".

At step 504, the database server uses the dictionary index that was obtained in step 502 as an index into the pointer array 400 to find the entry that corresponds to the index value. In the present example, during the third iteration of step 504, the index value "1" is used to locate entry 406 of pointer array 400.

At step 505, the database server determines whether the entry of pointer array 400 that was located in step 504 has any pointer. If the entry has a pointer, then control proceeds to step 506. Otherwise, control proceeds to step 510.

During the third iteration, entry 406 (which has a pointer) was located in step 504, so control proceeds from step 505 to step 506.

At step 506, the database server uses the pointer that was located in step 504 to locate the qualifying row(s) to which the current probe-side row joins. In the present example, the pointer in entry 406 points to the qualifying row 410.

At step 508, the database server generates result row(s) by combining columns from the current probe-side row with the qualifying row(s) located during step 506. In the present example, during the third iteration, values from the third row of fact table 300 are joined with qualifying row 410 to produce the result row:

| NAME | AGE | F-DEPT-ID | D-DEPT-ID | DEPT-NAME | BLDG |
|---|---|---|---|---|---|
| SALLY | 23 | 4562 | 4562 | SALES | A |

Control then proceeds to step 510, where it is determined whether any more rows of the probe-side table need to be processed. In the present example, fact table 300 has six rows, so after the third iteration there are still three rows to process. Therefore, control passes to step 514, and the next row is established as the current row. Control then passes back to 502 to process the fourth row of fact table 300.

During the fourth iteration of step 502, the database server reads the fourth entry of DECV 200, which is the dictionary index value "1".

At step 504, the database server uses the dictionary index that was obtained in step 502 as an index into the pointer array 400 to find the entry that corresponds to the index value. In the present example, during the fourth iteration of step 504, the index value "1" is used to locate entry 406 of pointer array 400.

At step 505, the database server determines whether the entry of pointer array 400 that was located in step 504 has any pointer. If the entry has a pointer, then control proceeds to step 506. Otherwise, control proceeds to step 510.

During the fourth iteration, entry 406 (which has a pointer) was located in step 504, so control proceeds from step 505 to step 506.

At step 506, the database server uses the pointer that was located in step 504 to locate the qualifying row(s) to which the current probe-side row joins. In the present example, the pointer in entry 406 points to the qualifying row 410.

At step 508, the database server generates result row(s) by combining columns from the current probe-side row with the qualifying row(s) located during step 506. In the present example, during the fourth iteration, values from the fourth row of fact table 300 are joined with qualifying row 410 to produce the result row:

| NAME | AGE | F-DEPT-ID | D-DEPT-ID | DEPT-NAME | BLDG |
|---|---|---|---|---|---|
| MARY | 45 | 4562 | 4562 | SALES | A |

Control then proceeds to step 510, where it is determined whether any more rows of the probe-side table need to be processed. In the present example, fact table 300 has six rows, so after the fourth iteration there are still two rows to process. Therefore, control passes to step 514, and the next row is established as the current row. Control then passes back to 502 to process the fifth row of fact table 300.

During the fifth iteration of step 502, the database server reads the fifth entry of DECV 200, which is the dictionary index value "2".

At step 504, the database server uses the dictionary index that was obtained in step 502 as an index into the pointer array 400 to find the entry that corresponds to the index value. In the present example, during the fifth iteration of step 504, the index value "2" is used to locate entry 408 of pointer array 400.

At step 505, the database server determines whether the entry of pointer array 400 that was located in step 504 has any pointer. If the entry has a pointer, then control proceeds to step 506. Otherwise, control proceeds to step 510.

During the fourth iteration, entry 408 (which has a pointer) was located in step 504, so control proceeds from step 505 to step 506.

At step 506, the database server uses the pointer that was located in step 504 to locate the qualifying row(s) to which the current probe-side row joins. In the present example, the pointer in entry 408 points to the qualifying row 412.

At step 508, the database server generates result row(s) by combining columns from the current probe-side row with the qualifying row(s) located during step 506. In the present example, during the fifth iteration, values from the fifth row of fact table 300 are joined with qualifying row 412 to produce the result row:

| NAME | AGE | F-DEPT-ID | D-DEPT-ID | DEPT-NAME | BLDG |
|------|-----|-----------|-----------|-----------|------|
| JIM  | 23  | 5315      | 5315      | AP        | A    |

Control then proceeds to step 510, where it is determined whether any more rows of the probe-side table need to be processed. In the present example, fact table 300 has six rows, so after the fifth iteration one row still needs to be processed. Therefore, control passes to step 514, and the next row is established as the current row. Control then passes back to 502 to process the sixth row of fact table 300.

During the sixth iteration of step 502, the database server reads the sixth entry of DECV 200, which is the dictionary index value "0".

At step 504, the database server uses the dictionary index that was obtained in step 502 as an index into the pointer array 400 to find the entry that corresponds to the index value. In the present example, during the sixth iteration of step 504, the index value "0" is used to locate entry 402 of pointer array 400.

At step 505, the database server determines whether the entry of pointer array 400 that was located in step 504 has any pointer. If the entry has a pointer, then control proceeds to step 506. Otherwise, control proceeds to step 510.

During the sixth iteration, entry 402 (which has no pointer) was located in step 504, so control proceeds from step 505 to step 510. At step 510, it is determined whether any more rows of the probe-side table need to be processed. In the present example, all six rows of fact table 300 have been processed, so control proceeds to 512 where the probe phase is done. At the end of the probe phase, the generated result rows are:

| NAME  | AGE | F-DEPT-ID | D-DEPT-ID | DEPT-NAME | BLDG |
|-------|-----|-----------|-----------|-----------|------|
| FRED  | 34  | 4562      | 4562      | SALES     | A    |
| SALLY | 23  | 4562      | 4562      | SALES     | A    |
| MARY  | 45  | 4562      | 4562      | SALES     | A    |
| JIM   | 23  | 5315      | 5315      | AP        | A    |

Probe-Side Filter Criteria

In the example given above, query Q1 specified filtering criteria for the build-side table "dept" 302, but not for the probe-side table "emp" 300. In cases where a query specifies filtering criteria for the probe-side filter, the probe-side filter is applied to each probe-side row. Only those probe-side rows that satisfy the probe-side filter criteria are processed as shown in FIG. 5. For example, if query Q1 specified the filter criteria "WHERE age >23", then the rows containing "Sally" and "Jim" would be filtered out, and the steps shown in FIG. 5 would only be performed for the four rows of table "emp" 300 that satisfy the probe-side filter criteria.

Collision and Chain Elimination

When the pointer array has an entry for each value in the dictionary, the types of collisions that are possible in hash joins are eliminated. Specifically, if the entries of the pointer array are considered buckets of a hash table, no collisions are possible because, for any given bucket, only one value will ever hash to the buckets. Thus, if the code for "name1" is 5, then the only value that will hash to hash bucket "5" in the pointer array is the value "name1".

In addition, when the join column of the build-side table is subject to a uniqueness constraint (such as when the join is on the primary key of the build-side table), a pointer array built using the techniques described herein will not have the chains that are possible with hash joins. Specifically, the uniqueness constraint ensures that each join key value maps to no more than one row in the build-side table. Consequently, when following a pointer from the entry of the pointer array that corresponds to a given join key value, it is not necessary to traverse a chain of entries and do a "mem-compare" operation on the values in the hash table entries in the chain to find the entry in the chain that contains the correct join key value. Avoiding collisions, and the mem-compare operations that are required to resolve them, is particularly beneficial in cases where the join keys are large (such as long strings).

Bloom Filters

As explained above, using a pointer array that is constructed as described herein allows the database server to quickly determine which build-side row joins with any given probe-side row. However, the pointer array does not itself indicate whether those build-side rows satisfy predicates that are not on the join key. According to one embodiment, one or more bloom filters are used in conjunction with the pointer array to answer a join query that has such predicates. In creating such bloom filters, the dictionary code of the join column can be treated as if it were a hash value, to avoid hashing overhead.

Specifically, using conventional bloom filter techniques, when a query that joins a fact table with a dimension table has a predicate on the dimension table, such as "dept.blgd='A'", then it is possible to build a probabilistic data structure known as a "bloom filter". A conventional bloom filter is created by:
- identifying the qualifying rows of the build-side table (the rows that satisfy the predicate)
- generating hash values by applying a hash function to join keys of the qualifying rows
- creating an array of N bits, each of which correspond to a hash bucket (a range of hash values)
- setting to "1" the bits that correspond to hash buckets into which any of the generated hash values fall.

Once such a bloom filter is created, it is possible to quickly determine that a row of the probe-side table does not join with a build-side row that satisfies the predicate by (a) generating a hash value by applying the hash function to the join key of the probe-side row, and (b) determining that the bloom filter bit that corresponds to the bucket into which the hash value falls is not set. If the relevant bit of the bloom filter is not set, then it is guaranteed that the build-side row does not join with any build-side rows. However, if the relevant bit in the bloom filter is set, there is no guarantee that the build-side row does join with any build-side rows. Stated another way, false negatives (concluding that there is no joining build-side row when there is) cannot happen, but false positives (concluding that there is a joining build-side row when there is not) can.

Using the techniques described herein, the overhead of building such bloom filters is reduced by using the dictionary code (or a value derived therefrom) as the hash value for both creating and evaluating the bloom filter. A bloom filter built using the dictionary code (or a value derived therefrom) as the hash value is referred to herein as a "dictionary-based filter". Dictionary-based filters are described in greater detail hereafter.

Before performing steps 502 to 508 on any given probe-side row, a dictionary-based filter constructed in the manner described hereafter may be used to avoid those steps for rows whose join key hashes to a bloom filter bit that is not set.

Dictionary-Based Filters

When the join columns of all tables involved in a join have been encoded using a common dictionary, the dictionary code for each value can be used as the hash value to create a bloom filter. Bloom filters created in this manner are referred to herein as dictionary-based filters. In one embodiment of a dictionary-based filter, each dictionary code can be treated as its own bucket. In such an embodiment, the filter has the same number of bits as the number of distinct values in the common dictionary. Using this technique, the resulting dictionary-based filter has one bit for each distinct value in the global dictionary, and indicates whether the build-side row that corresponds that join key value satisfies a predicate. For the pointer array illustrated in FIG. 4, the corresponding bloom filter would be "011", indicating that the build-side row that corresponds to dictionary value at index 0 does not satisfy the predicate "bldg.=A" and that the build-side rows that correspond to the dictionary values at indexes 1 and 2 do satisfy the predicate "bldg.=A".

When each dictionary code is treated as its own bucket in constructing such a dictionary-based filter, the resulting dictionary-based filter is deterministic. Specifically, if the relevant bit of the dictionary-based filter is not set, then it is guaranteed that the corresponding build-side row does not satisfy the relevant predicate. Further, if the relevant bit in the dictionary-based filter is set, it is also guaranteed that the corresponding build-side row does satisfy the relevant predicate. Consequently, both false negatives and false positives are avoided. The dictionary-based filter can be added as a predicate when filtering the probe-side rows. By doing so, any probe-side rows that do not join with any build-side rows are filtered out even before the probe phase.

For very large global dictionaries, it may be desirable to reduce the size of the dictionary-based filter. The size of the dictionary-based filter may be reduced by mapping multiple dictionary codes to each bucket. For example, each bucket may correspond to a distinct range of dictionary codes. As another example, a MOD operation may be performed on the dictionary codes to determine a bucket. By performing a "MOD 50" operation on the codes from a dictionary that contains 1000 codes, the size of the dictionary-based filter is reduced from 1000 to 50. The cost of reducing the size of the dictionary-based filter in this manner is that the dictionary-based filter ceases to be deterministic (i.e. false positives are possible), but in some cases that cost may be outweighed by the improved performance produced by the smaller filter size. Even when a MOD operation is performed for each probe-side row, the amount of computing resources required to perform the MOD operation on a fixed-width numerical code is significantly less than the amount of resources that would be required by conventional bloom filters which apply hash function to the actual join key (which may be a large string) of each probe-side row.

Benefits

Numerous benefits result from using a common dictionary to encode columns that are frequently joined. For example, by replacing a traditional hash table to perform the join with a simple table lookup using encoded values, SIMD vector processing can be leveraged heavily by gathering payload column pointers and lengths and storing/projecting them in parallel.

In addition, replacing wide column values with dictionary index codes helps achieve compression of join tables. Since hash computation is not needed at execution time query performance of hash joins improves significantly. This is true for both hash-table and bloom-filter creation and evaluation.

The process of identifying join groups and creating the domain dictionaries can be automated by creating join groups from Primary Key-Foreign Key relations. The database server (or users) also has the flexibility to add/remove columns from join groups. Join groups can also be created explicitly by extending SQL syntax.

The fixed-size nature of the elements in the vector of dictionary indexes allows use of SIMD operations to parallelize processing of several elements at a time for faster joining/matching and projection of payload columns.

When the database server creates a schema, the database server identifies all the underlying Primary Key-Foreign Key relations and creates a join group DDL for each such relation. In addition, using our extensions to the SQL syntax users can explicitly create join groups using DDL on one or more columns of one or more tables.

In one embodiment, creating a join group will trigger creation of a dictionary per join group. The dictionary will contain a sorted list of all the unique values in the join group. Each value can then be substituted by the index of the value in this list. In one embodiment, the tables are then recoded using the dictionary index instead of actual values for the join columns. Since the dictionary index can be just as wide as necessary to represent the total number of unique values, this recoding usually results in compression of the tables.

Left Semi-Joins

The approaches that have been described herein in the context of inner joins can be generalized to handle non-inner joins such as semi-joins, anti-joins and outer joins. For example, a left semi-join returns rows from the "left-side" table that would join with the "right-side table" without performing a complete join. For left semi-joins, a join group code array (e.g. pointer array 400) is built using global dictionary codes as indexes, which essentially is an array of memory pointers pointing to the build-side rows (e.g. qualifying rows 410 and 412) stored in hash join internal memory (e.g. volatile memory 440). In one embodiment, the build-side rows are stored in hash join internal memory in length-value format together with some extra data such as hash value, etc.

During probe phase, the database server uses global dictionary codes of the join key column from probe-side rows as indexes to join group code array to see if there is a non-null memory pointer (a non-null memory pointer means there exists a match). If the corresponding join group code array element has a non-null memory pointer, then perform unpacking (de-serialize) build-side row (as pointed by the memory pointer) into build-side column operands' value length field and value buffer pointer field. Then, output the result row (essentially the value lengths and value buffer pointers of build-side column operands). Finally, nullify the corresponding join group code array element (memory pointer).

Right Semi-Joins

A right semi-join returns rows from the "right-side" table that would join with the "left-side table" without performing a complete join. For right semi-joins, a bit vector instead of a join group code array can be built using global dictionary codes as indexes. Likewise, during probe phase, the database server uses global dictionary codes of join key column from probe-side rows as indexes to the bit vector to find out whether there are matches from the build-side. If the corresponding bit is set in the bit vector, then the database server produces the right semi-join results (essentially, value lengths and value buffer pointers of probe-side operands).

Left Anti-Joins

A left anti-join returns rows from the left-side table that would not join with the right-side table. These are the rows that would be NULL extended if an outer join were performed. For left anti-joins, a join group code array is built. During probe phase, the database server uses global dictionary codes of join key column from probe-side rows as indexes to the join group code array to see if there is a non-null memory pointer. If the corresponding join group code array element has a non-null memory pointer, nullify the corresponding join code array element (memory pointer). After finishing processing all input probe rows, the database server can loop join group code array to get elements with non-null memory pointers to produce final join results, which involves unpacking (de-serialized) build-side rows as pointed by the memory pointers into build-side column operands' value length field and value buffer pointer field.

Right Anti-Joins

A right anti-join returns rows from the right-side table that would not join with the left-side table. For right anti-joins, a bit vector instead of a join group code array can be built using global dictionary codes as indexes. During probe phase, the database server uses global dictionary codes of join key column from the probe-side rows as indexes to the bit vector to find out whether there are matches from the build-side. If the corresponding bit is NOT set in the bit vector, then produce the right anti join results (essentially, value lengths and value buffer pointers of probe-side operands).

Left Outer-Joins

A left outer join preserves all rows in the left-side table even if there is no matching right-side row per the join predicate. For left outer-joins, a join group code array is built. During probe phase, a bit vector needs to be maintained to indicate whether the build-side rows have matches from the probe-side and the database server uses global dictionary codes of join key column from probe-side rows as indexes to the join group code array to see if there is a non-null memory pointer. If the corresponding join group code array element has a non-null memory pointer, set a bit in the bit vector to indicate the corresponding build-side row has a match from the probe-side and then produce join result by unpacking (de-serialized) build-side row as pointed by the memory pointer into build-side column operands' value length field and value buffer pointer field. Note that these build-side operands' value lengths and value buffer pointers together with probe-side operands' value lengths and value buffer pointers are join results. Once the database server finishes processing all probe-side rows, the database server needs to output build-side rows which do not have any match from the probe-side by looping through join group code array. For an array element with non-null memory pointer and its corresponding bit in the bit vector which does not get set, the database server needs to perform unpacking of build-side row as pointed by the memory pointer into build-side column operands' value length field and value buffer pointer field. Then, output the join results which are comprised of build-side operands' value lengths and value buffer pointers together with nullified probe-side operands' value lengths and value buffer pointers.

Right Outer-Joins

A right outer join preserves all rows in the right-side table even if there is no matching left-side row per the join predicate. For right outer-joins, a join group code array is built. During probe phase, the database server uses global dictionary codes of join key columns from probe-side rows as indexes to the join group code array to see if there is a non-null memory pointer. If the corresponding join group code array element has a non-null memory pointer, performing unpacking (de-serializing) of build-side row as pointed by the memory pointer into build-side column operands' value length field and value buffer pointer field. Then, produce join results which are comprised of build-side operands' value lengths and value buffer pointers together with probe-side operands' value lengths and value buffer pointers. If the corresponding join group code array element has a null memory pointer, nullify the build-side column operands' value lengths and value buffer pointers and then produce join result (nullified build-side column operands' value lengths and value buffer pointers together with probe-side operands' value lengths and value buffer pointers).

Full Outer-Joins

A full outer join preserves all rows both of the input tables even if matching rows do not exist per the join predicate. For full outer-joins, a join group code array is built. During probe phase, a bit vector needs to be maintained to indicate whether the build-side rows have matches from the probe-side and the database server uses global dictionary codes of join key column from probe-side rows as indexes to the join group code array to see if there is a non-null memory pointer. If the corresponding join group code array element has a non-null memory pointer, set a bit in the bit vector to indicate the corresponding build-side row has a match from the probe-side and then produce join result by unpacking (de-serialized) build-side row as pointed by the memory pointer into build-side column operands' value length field and value buffer pointer field. Note that these build-side operands' value lengths and value buffer pointers together with probe-side operands' value lengths and value buffer pointers are join results. If the corresponding join group code array element has a null memory pointer, nullify the build-side column operands' value lengths and value buffer pointers and then produce join result (nullified build-side column operands' value lengths and value buffer pointers together with probe-side operands' value lengths and value buffer pointers). Once the database server finishes processing all probe-side rows, the database server needs to output build-side rows which do not have any match from the probe-side by looping through join group code array. For an array element with non-null memory pointer and its corresponding bit in the bit vector which does not get set, the database server needs to perform unpacking of build-side row as pointed by the memory pointer into build-side column operands' value length field and value buffer pointer field. Then, output the join results which are comprised of build-side operands' value lengths and value buffer pointers together with nullified probe-side operands' value lengths and value buffer pointers.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
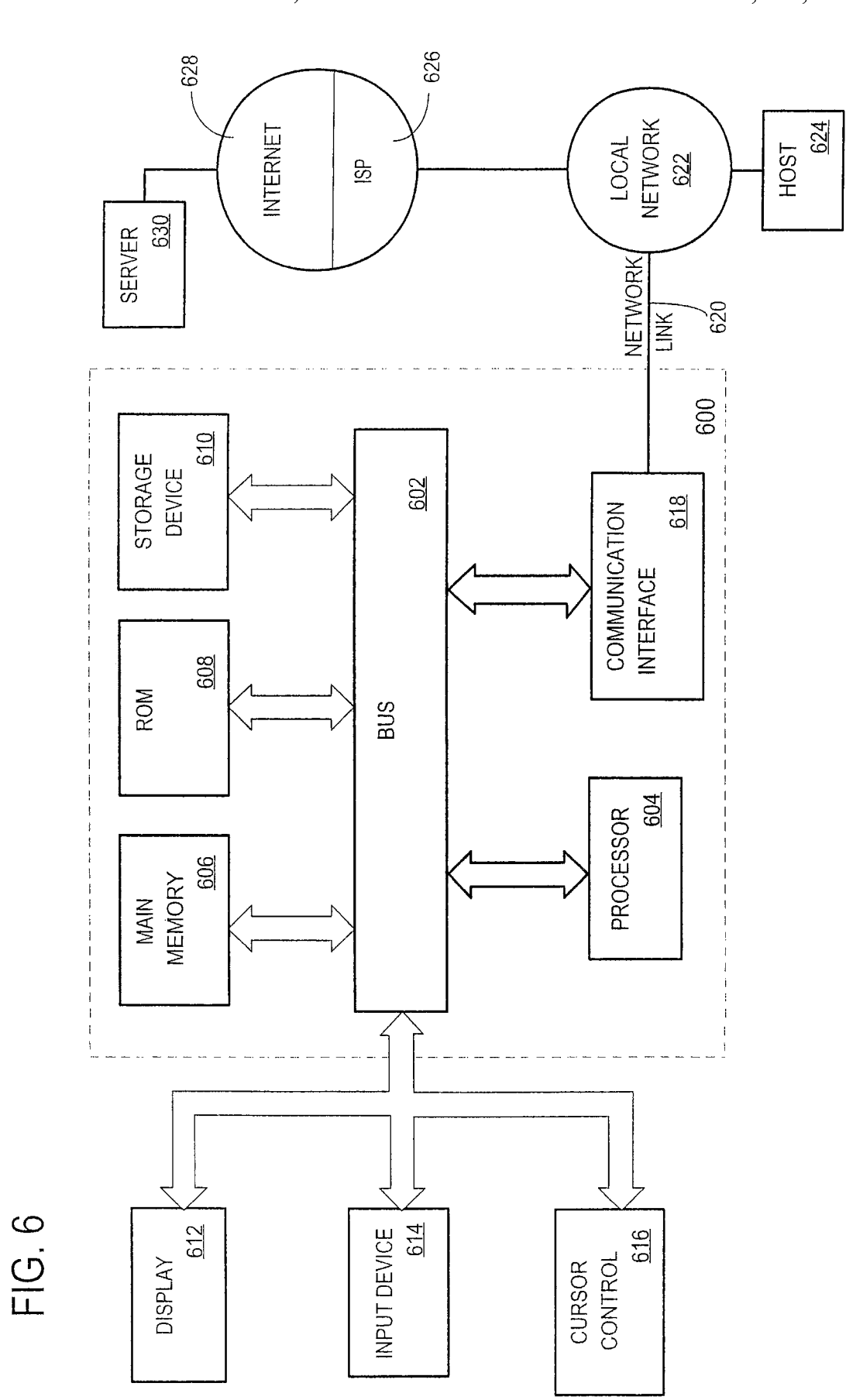
FIG. 6 is a block diagram of a computer system upon which embodiments of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   maintaining, by a database server, a first table that has a first column and a second table that has a second column;
   maintaining a particular dictionary that contains dictionary values;
   wherein each value in the first column matches a corresponding dictionary value in the particular dictionary;
   wherein each value in the second column matches a corresponding dictionary value in the particular dictionary;
   in response to the database server receiving a request to execute a query that joins the first table with the second table based on the first column and the second column, the database server performing:
   building a pointer array that includes a plurality of entries;
   wherein each entry of the plurality of entries is at a position within the pointer array that corresponds to a position of a dictionary value within the particular dictionary;
   storing, within one or more of the plurality of entries, information for identifying which rows of the second table have values, in the second column, that match the dictionary value that corresponds to the entry;
   after building the pointer array, performing the following for each row of a plurality of rows in the first table:
   determining a dictionary index for the row, wherein the dictionary index for the row is the position, within the particular dictionary, of the dictionary value that matches the value in the first column of the row;
   locating a target entry, in the pointer array, that corresponds to the dictionary index; and
   based on information contained in the target entry, determining zero or more rows of the second table that join with the row;
   wherein the database server is executing on one or more computing devices.

2. The method of claim 1 further comprising:
   using the particular dictionary, creating a dictionary-encoded column vector for the first column; and
   wherein determining the dictionary index for each row of the first table is performed by reading dictionary index values from the dictionary-encoded column vector.

3. The method of claim 1 wherein:
   the query has a predicate that specifies filter criteria for rows of the second table;
   the method further comprises building a bloom filter to identify rows, of the second table, that satisfy the filter criteria;
   wherein the bloom filter is built using, as a hash value for each row of the second table, the position of the dictionary value, within the particular dictionary, that matches the value in the second column of the row.

4. The method of claim 1 wherein:
   the query does not have a predicate that specifies filter criteria for rows of the second table; and
   the step of storing information within one or more of the plurality of entries is performed for each entry of the plurality of entries.

5. The method of claim 1 wherein each entry in the pointer array has a fixed size and locating the target entry comprises multiplying the dictionary index by the fixed size to generate an offset into the pointer array.

6. The method of claim 1 further comprising:
   for a first particular row of the first table, locating a target entry that includes a pointer to one or more values from a second particular row of the second table; and
   generating a result row that includes one or more values from the first particular row and one or more values from the second particular row.

7. The method of claim 1 further comprising:
   for a first particular row of the first table, locating a target entry that includes no pointer; and
   generating no result row based on the first particular row.

8. The method of claim 1 wherein storing information within one or more of the plurality of entries comprises storing, within the one or more of the plurality of entries, a pointer to a location, within volatile memory, that stores one or more values from a row, of the second table, that has a value in the second column that matches the dictionary value that corresponds to the entry.

9. The method of claim 1 wherein the query specifies no filter criteria for the first table, and the plurality of rows in the first table includes all rows in the first table.

10. The method of claim 1 wherein the query specifies filter criteria for rows of the first table, and the plurality of rows in the first table includes only rows in the first table that satisfy the filter criteria for rows of the first table.

11. The method of claim 1 wherein the join is one of a left semi-join, a left anti-join, a left outer-join, a right outer-join or a full outer-join.

12. A method comprising:
   maintaining, by a database server, a first table that has a first column and a second table that has a second column;
   maintaining a particular dictionary that contains dictionary values;
   wherein each value in the first column matches a corresponding dictionary value in the particular dictionary, the corresponding dictionary value having a respective position within the particular dictionary;
   wherein each value in the second column matches a corresponding dictionary value in the particular dictionary, the corresponding dictionary value having a respective position within the particular dictionary; and
   in response to the database server receiving a request to execute a query that joins the first table with the second table based on the first column and the second column, the database server, wherein the query has a predicate that specifies filter criteria for rows of the second table, building a dictionary-based filter to identify rows, of the second table, that satisfy the filter criteria, using, as a hash value for each row of the second table, the respective position of the dictionary value, within the particular dictionary, that matches the value in the second column of the row.

13. The method of claim 12 wherein the dictionary-based filter has one bit for each dictionary code in the particular dictionary, and generating the dictionary-based filter comprises setting each bit of the dictionary-based filter based on whether the dictionary value that corresponds to the bit is present in the second column of any row of the second table that satisfies the filter criteria.

14. The method of claim 12 wherein the dictionary-based filter has one bit for multiple dictionary codes in the particular dictionary, and generating the dictionary-based filter comprises setting each bit of the dictionary-based filter based on whether any of the dictionary values covered by the bit are present in the second column of any row of the second table that satisfies the filter criteria.

15. A method comprising:
   using a particular dictionary, a database server creating a first dictionary-encoded column vector for a first column of a first table;
   using the particular dictionary, the database server creating a second dictionary-encoded column vector for a second column of a second table;
   in response to the database server receiving a request to execute a query that joins the first table with the second table based on the first column and the second column, the database server performing:
      building a bit vector that includes a plurality of bits;
      wherein each bit of the plurality of bits is at a position within the bit vector that corresponds to a dictionary value within the particular dictionary;
      setting, within the bit vector, bits that correspond to dictionary values that are represented in the second dictionary-encoded column vector;
      performing the following for a plurality of rows in the first table:
         reading a dictionary index, for the row, from the first dictionary-encoded column vector;
         locating a target bit, in the bit vector, that corresponds to the dictionary index; and
         based on whether the target bit is set, determining whether any rows of the second table that join with the row;
   wherein the database server is executing on one or more computing devices.

16. The method of claim 15 wherein the query specifies one of: a right semi-join or a right anti-join.

17. One or more non-transitory computer readable media storing instructions which, when executed by one or more computing devices, cause:
   maintaining, by a database server, a first table that has a first column and a second table that has a second column;
   maintaining a particular dictionary that contains dictionary values;
   wherein each value in the first column matches a corresponding dictionary value in the particular dictionary;
   wherein each value in the second column matches a corresponding dictionary value in the particular dictionary;
   in response to the database server receiving a request to execute a query that joins the first table with the second table based on the first column and the second column, the database server performing:
      building a pointer array that includes a plurality of entries;
      wherein each entry of the plurality of entries is at a position within the pointer array that corresponds to a position of a dictionary value within the particular dictionary;
      storing, within one or more of the plurality of entries, information for identifying which rows of the second table have values, in the second column, that match the dictionary value that corresponds to the entry;
      after building the pointer array, performing the following for each row of a plurality of rows in the first table:
         determining a dictionary index for the row, wherein the dictionary index for the row is the position, within the particular dictionary, of the dictionary value that matches the value in the first column of the row;
         locating a target entry, in the pointer array, that corresponds to the dictionary index; and
         based on information contained in the target entry, determining zero or more rows of the second table that join with the row.

18. The one or more non-transitory computer readable media of claim 17 further comprising instructions for:
   using the particular dictionary, creating a dictionary-encoded column vector for the first column; and
   wherein determining the dictionary index for each row of the first table is performed by reading dictionary index values from the dictionary-encoded column vector.

19. The one or more non-transitory computer readable media of claim 17 wherein:
   the query has a predicate that specifies filter criteria for rows of the second table;
   the one or more non-transitory computer readable media further comprises instructions for building a bloom filter to identify rows, of the second table, that satisfy the filter criteria;

wherein the bloom filter is built using, as a hash value for each row of the second table, the position of the dictionary value, within the particular dictionary, that matches the value in the second column of the row.

20. The one or more non-transitory computer readable media of claim 17 wherein:
the query does not have a predicate that specifies filter criteria for rows of the second table; and
the step of storing information within one or more of the plurality of entries is performed for each entry of the plurality of entries.

21. The one or more non-transitory computer readable media of claim 17 wherein each entry in the pointer array has a fixed size and locating the target entry comprises multiplying the dictionary index by the fixed size to generate an offset into the pointer array.

22. The one or more non-transitory computer readable media of claim 17 further comprising instructions for:
for a first particular row of the first table, locating a target entry that includes a pointer to one or more values from a second particular row of the second table; and
generating a result row that includes one or more values from the first particular row and one or more values from the second particular row.

23. The one or more non-transitory computer readable media of claim 17 further comprising instructions for:
for a first particular row of the first table, locating a target entry that includes no pointer; and
generating no result row based on the first particular row.

24. The one or more non-transitory computer readable media of claim 17 wherein storing information within one or more of the plurality of entries comprises storing, within the one or more of the plurality of entries, a pointer to a location, within volatile memory, that stores one or more values from a row, of the second table, that has a value in the second column that matches the dictionary value that corresponds to the entry.

25. The one or more non-transitory computer readable media of claim 17 wherein the join is one of a left semi-join, a left anti-join, a left outer-join, a right outer-join or a full outer-join.

26. One or more non-transitory computer readable media comprising instructions which, when executed by one or more computing devices, cause:
maintaining, by a database server, a first table that has a first column and a second table that has a second column;
maintaining a particular dictionary that contains dictionary values;
wherein each value in the first column matches a corresponding dictionary value in the particular dictionary, the corresponding dictionary value having a respective position within the particular dictionary;
wherein each value in the second column matches a corresponding dictionary value in the particular dictionary, the corresponding dictionary value having a respective position within the particular dictionary; and
in response to the database server receiving a request to execute a query that joins the first table with the second table based on the first column and the second column, the database server, wherein the query has a predicate that specifies filter criteria for rows of the second table, building a dictionary-based filter to identify rows, of the second table, that satisfy the filter criteria, using, as a hash value for each row of the second table, the respective position of the dictionary value, within the particular dictionary, that matches the value in the second column of the row.

27. One or more non-transitory computer readable media comprising instructions which, when executed by one or more computing devices, cause:
using a particular dictionary, a database server creating a first dictionary-encoded column vector for a first column of a first table;
using the particular dictionary, the database server creating a second dictionary-encoded column vector for a second column of a second table;
in response to the database server receiving a request to execute a query that joins the first table with the second table based on the first column and the second column, the database server performing:
building a bit vector that includes a plurality of bits;
wherein each bit of the plurality of bits is at a position within the bit vector that corresponds to a dictionary value within the particular dictionary;
setting, within the bit vector, bits that correspond to dictionary values that are represented in the second dictionary-encoded column vector;
performing the following for each row of a plurality of rows in the first table:
reading a dictionary index, for the row, from the first dictionary-encoded column vector;
locating a target bit, in the bit vector, that corresponds to the dictionary index; and
based on whether the target bit is set, determining whether any rows of the second table that join with the row.

28. The one or more non-transitory computer readable media of claim 27 wherein the query specifies one of: a right semi-join or a right anti-join.

* * * * *

UNITED STATES PATENT AND TRADEMARK OFFICE
CERTIFICATE OF CORRECTION

PATENT NO. : 10,678,791 B2  
APPLICATION NO. : 15/602009  
DATED : June 9, 2020  
INVENTOR(S) : Chavan et al.

Page 1 of 1

It is certified that error appears in the above-identified patent and that said Letters Patent is hereby corrected as shown below:

On the Title Page

In Column 2, item (56), under Other Publications, Line 3, delete "Proccedings" and insert -- Proceedings --, therefor.

In the Specification

In Column 2, Line 36, delete "wikiBloom" and insert -- wiki/Bloom --, therefor.

In Column 2, Line 52, before "projected," insert -- be --.

In Column 12, Line 53, delete ""dept.blgd" and insert -- "dept.bldg --, therefor.

In Column 15, Line 34 (Approx.), delete "NULL" and insert -- null --, therefor.

In Column 15, Line 59 (Approx.), delete "NOT" and insert -- not --, therefor.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*